(12) United States Patent
Ravi

(10) Patent No.: US 12,031,832 B2
(45) Date of Patent: Jul. 9, 2024

(54) SYSTEMS AND METHODS FOR ENERGY EFFICIENT MOBILITY USING MACHINE LEARNING AND ARTIFICIAL INTELLIGENCE

(71) Applicant: Ford Global Technologies, LLC, Dearborn, MI (US)

(72) Inventor: Vinod Ravi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 586 days.

(21) Appl. No.: 17/206,909

(22) Filed: Mar. 19, 2021

(65) Prior Publication Data

US 2022/0299327 A1    Sep. 22, 2022

(51) Int. Cl.
| | | |
|---|---|---|
| G01C 21/34 | (2006.01) |
| B60W 30/16 | (2020.01) |
| B60W 40/105 | (2012.01) |
| G01S 17/89 | (2020.01) |
| G06N 20/00 | (2019.01) |
| G06V 20/58 | (2022.01) |

(52) U.S. Cl.
CPC ......... *G01C 21/3469* (2013.01); *B60W 30/16* (2013.01); *B60W 40/105* (2013.01); *G01S 17/89* (2013.01); *G06N 20/00* (2019.01); *G06V 20/584* (2022.01); *B60W 2554/802* (2020.02); *B60W 2556/10* (2020.02); *G06V 2201/08* (2022.01)

(58) Field of Classification Search
CPC ............... B60W 30/16; B60W 40/105; B60W 2554/802; B60W 2556/10; B60W 2554/4042; B60W 2754/30; B60W 40/1005; B60W 50/14; B60W 40/00; B60W 2420/42; B60W 2020/403; G01C 21/3469; G01C 21/3407; G06V 20/625; G06V 20/56; G06V 20/584; G06V 2201/08; G01S 17/89; G06N 20/00
USPC ......................................................... 701/123
See application file for complete search history.

(56) References Cited

U.S. PATENT DOCUMENTS

| | | | | |
|---|---|---|---|---|
| 9,182,764 | B1* | 11/2015 | Kolhouse | G05D 1/0291 |
| 10,124,808 | B2* | 11/2018 | Phelan | G06Q 40/08 |
| 10,192,171 | B2* | 1/2019 | Taylor | G06N 3/08 |
| 10,272,921 | B2* | 4/2019 | Edgington | B60K 28/066 |
| 2010/0194144 | A1* | 8/2010 | Sinha | B62D 37/02 |
| | | | | 296/180.2 |

(Continued)

FOREIGN PATENT DOCUMENTS

| | | |
|---|---|---|
| WO | 2017119541 A1 | 7/2017 |
| WO | 2019063352 A1 | 4/2019 |

OTHER PUBLICATIONS

Jan Cedric Mertens, et al., "The Need for Cooperative Automated Driving", Electronics 2020, 9, 754 (19 pages).

*Primary Examiner* — Mohamed Abdo Algehaim
(74) *Attorney, Agent, or Firm* — Emily Drake; Eversheds Sutherland (US) LLP

(57) ABSTRACT

Systems and methods for energy efficient mobility are provided. The method may include identifying a vehicle moving on a road, calculating a first energy required to complete a trip, determining a size of an air pocket zone of the vehicle, calculating a second energy required to transition to the air pocket zone of the vehicle and to complete the trip in the air pocket zone of the vehicle, and transitioning to the air pocket zone of the vehicle if the second energy is more energy efficient than the first energy.

18 Claims, 6 Drawing Sheets

(56) References Cited

U.S. PATENT DOCUMENTS

| | | | | |
|---|---|---|---|---|
| 2012/0158299 A1* | 6/2012 | Cerecke | G01C 21/3469 | |
| | | | 701/533 | |
| 2012/0255350 A1* | 10/2012 | Nobles | G01M 9/067 | |
| | | | 73/147 | |
| 2013/0073112 A1* | 3/2013 | Phelan | B60W 40/107 | |
| | | | 701/1 | |
| 2013/0080018 A1* | 3/2013 | Baek | G01L 15/00 | |
| | | | 701/1 | |
| 2017/0001639 A1* | 1/2017 | Dempsey | G08G 1/16 | |
| 2017/0057492 A1* | 3/2017 | Edgington | B60K 28/066 | |
| 2018/0079405 A1* | 3/2018 | Gaither | B60W 10/10 | |
| 2018/0174457 A1* | 6/2018 | Taylor | G08G 1/0962 | |
| 2018/0201243 A1* | 7/2018 | Pennala | B60T 13/66 | |
| 2019/0047545 A1* | 2/2019 | Gaither | B60W 30/143 | |
| 2019/0154453 A1* | 5/2019 | Leone | B60W 30/188 | |
| 2019/0171227 A1* | 6/2019 | Sujan | G05D 1/0295 | |
| 2019/0195650 A1* | 6/2019 | Matthews | G01C 21/3697 | |
| 2019/0308624 A1* | 10/2019 | Borhan | B60W 30/165 | |
| 2020/0216069 A1* | 7/2020 | Elflein | B60W 50/0097 | |
| 2020/0241541 A1 | 7/2020 | McCawley et al. | | |
| 2020/0282988 A1* | 9/2020 | Madrigal | G06F 16/24553 | |
| 2021/0150429 A1* | 5/2021 | Atanasiu | G01C 21/3469 | |
| 2021/0213948 A1* | 7/2021 | Lahti | B60W 30/162 | |
| 2021/0253097 A1* | 8/2021 | Lacaze | B60W 40/105 | |
| 2022/0073070 A1* | 3/2022 | Niewiadomski | B60W 30/16 | |
| 2022/0105933 A1* | 4/2022 | Shieh | G06V 20/58 | |
| 2022/0105934 A1* | 4/2022 | Shieh | B60W 40/1005 | |
| 2022/0135071 A1* | 5/2022 | Smith | B60W 10/04 | |
| | | | 701/25 | |
| 2022/0215757 A1* | 7/2022 | Michel | G08G 1/22 | |
| 2022/0266829 A1* | 8/2022 | Thompson | B60W 50/087 | |
| 2022/0292889 A1* | 9/2022 | Tanizawa | G07C 5/02 | |
| 2022/0349722 A1* | 11/2022 | Con | G08G 1/096775 | |
| 2022/0371590 A1* | 11/2022 | Busse | B60W 40/10 | |
| 2023/0356788 A1* | 11/2023 | Sandgren | B62D 35/00 | |
| 2023/0385489 A1* | 11/2023 | Askerdal | G06F 30/28 | |

* cited by examiner

SYSTEMS AND METHODS FOR ENERGY EFFICIENT MOBILITY USING MACHINE LEARNING AND ARTIFICIAL INTELLIGENCE

BACKGROUND

Slipstreaming or "drafting" is a technique used by race car drivers to gain straight line speed advantage for overtaking. Principally, it works when a vehicle cuts through the air creating an air pocket at the rear of the vehicle, where there is turbulent air. Turbulent air typically produces less drag, allowing faster speeds and more efficiency for a second vehicle positioned within the turbulent air. It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1A:
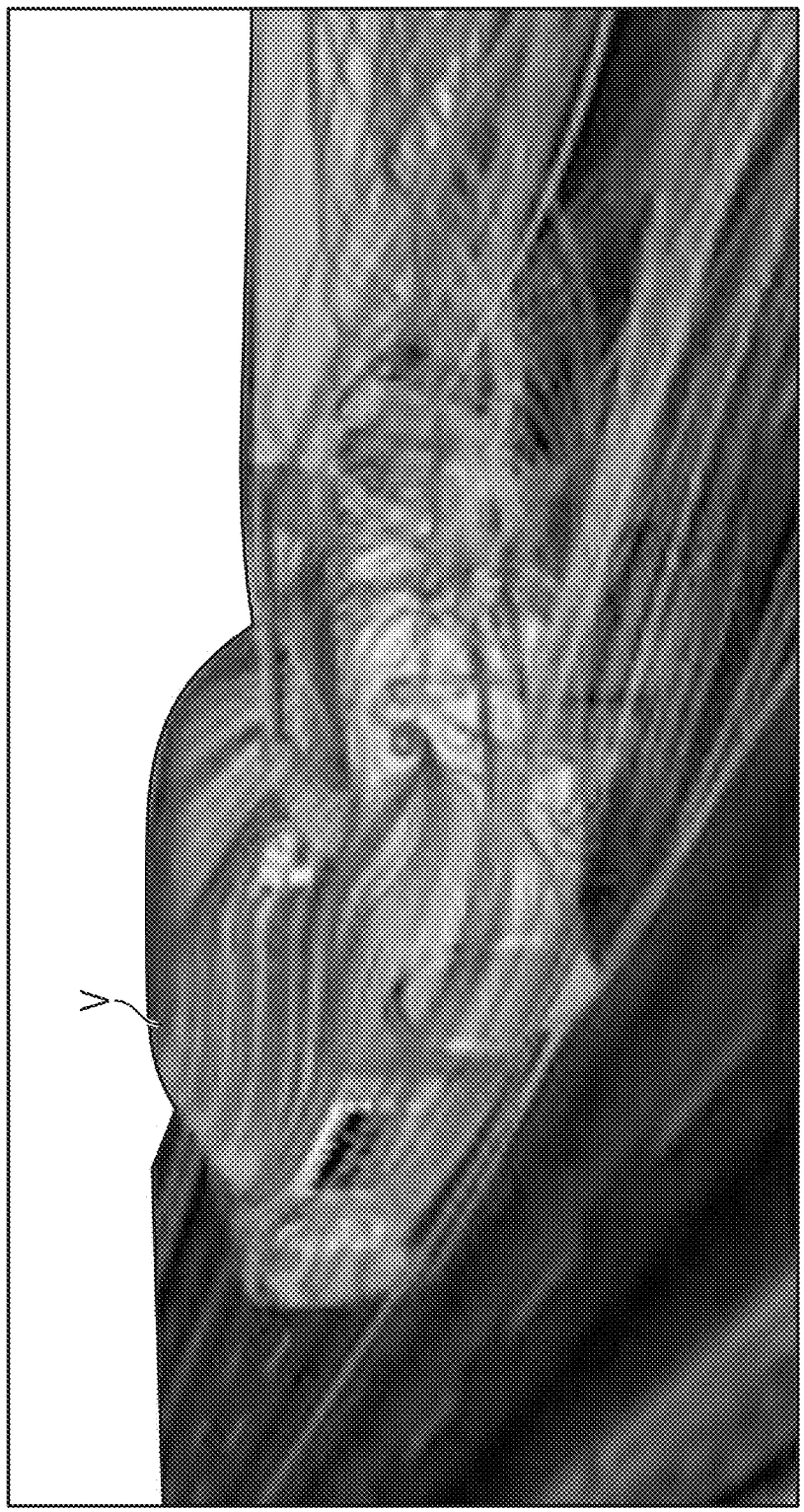
FIGS. 1A and 1B illustrate the drag forces of an aerodynamic vehicle.

Disclosed are systems and methods for a vehicle to identify an air pocket zone (APZ) behind another vehicle using machine learning and/or artificial intelligence (AI) and to allow the vehicle to cruise in this air pocket zone (low pressure zone or turbulent zone) where drag is minimum hence low energy is used for propulsion. This permits the vehicle to complete its trip with lowest energy usage and lowest time taken. The trip under such a scenario may require multiple lane switches on the road. For example, the vehicle may be cruising behind an SUV, and if a trailer truck is identified by the vehicle, the vehicle may switch lanes, accelerate/decelerate to approach the air pocket zone of the trailer truck and cruise behind the trailer truck until deemed beneficial. Energy efficiency may be calculated for the lane switch and compared to the cruising time, speed, and other factors including overall safety.

One motive is to optimize the energy used for the entire trip. The methods described herein may be used to determine whether to switch or not such that entire trip energy efficiency is optimized. This may or may not involve interacting with other vehicles. Moreover, a percentage scale may be provided to the driver of the vehicle to determine aggressive switching or minimal switching for their trips. For example, the driver may not want to perform many lane switches behind vehicles on a snowy day as opposed to a sunny day with less traffic.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Figure 1B:
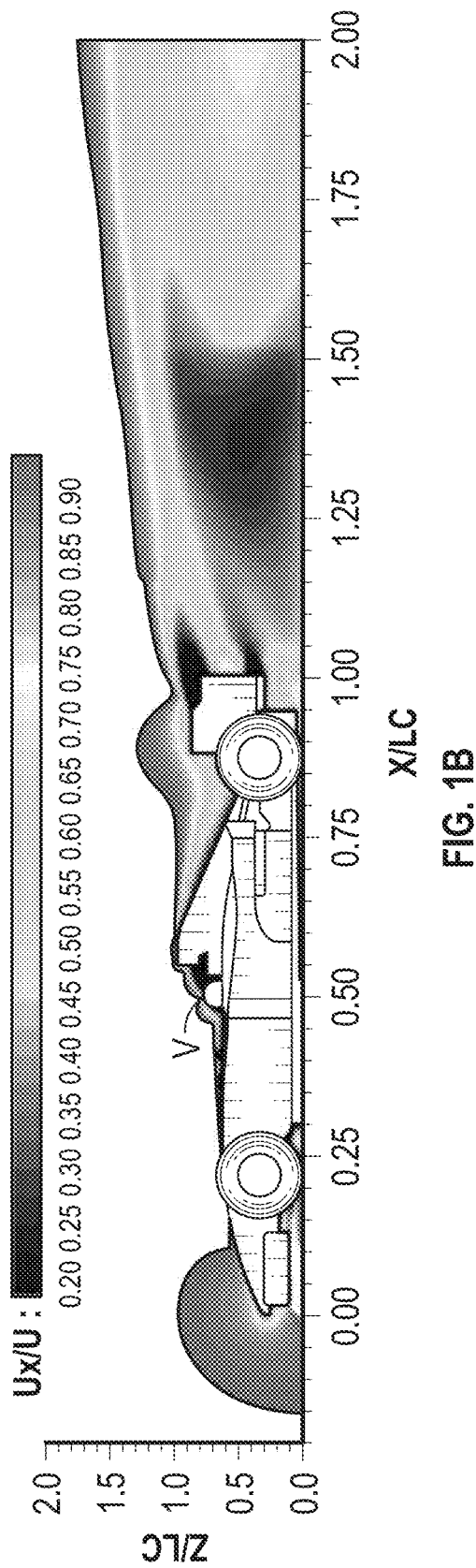
Figure 1C:
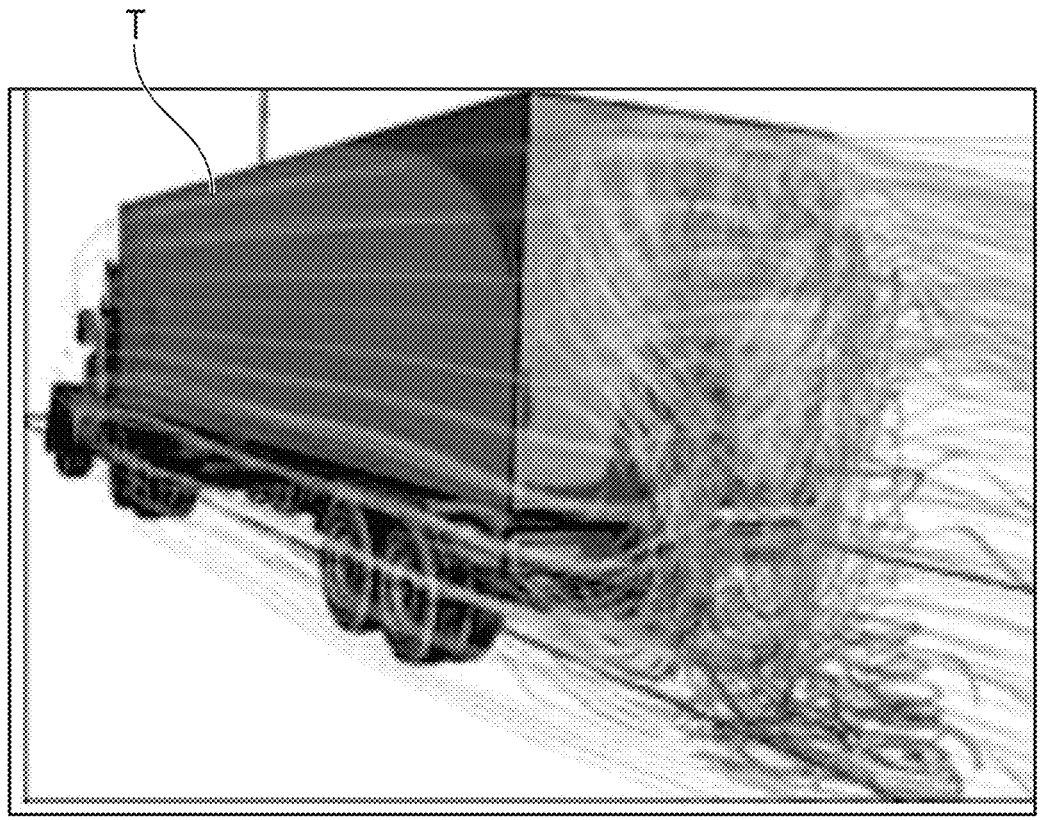
FIGS. 1C and 1D illustrate the drag forces of a less aerodynamic vehicle.
Figure 1D:
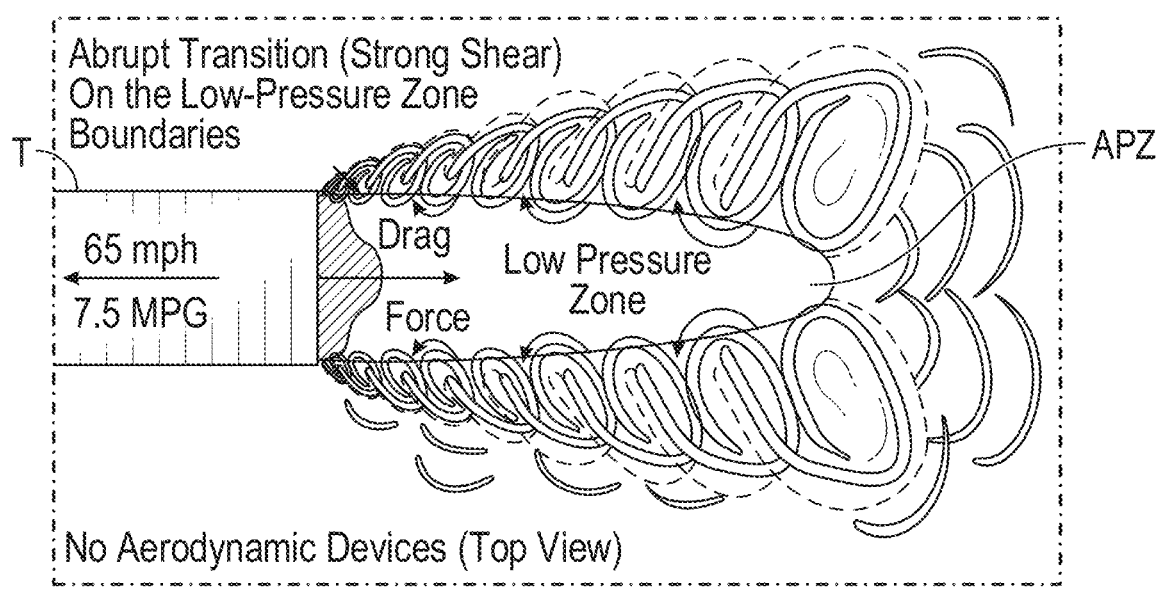

In accordance with the principles of the present disclosure, the air pocket zone (APZ) of nearby vehicles on a road may be identified, such that cruising in the APZ of a vehicle with a larger APZ, and thus, less drag forces, may optimize total energy efficiency for a given trip. As shown in FIGS. 1A and 1B, smaller and more aerodynamic vehicles, e.g., vehicle V, generally have a smaller APZ as the aerodynamic design causes less turbulence and creates a more laminar flow behind the vehicle. In contrast, as shown in FIGS. 1C and 1D, larger and less aerodynamic vehicles, e.g., trailer truck T, generally have a larger APZ as the vehicle creates more turbulent flow with less drag, which has lower pressure allowing for faster speeds. As shown in FIG. 1D, the abrupt transition of air flow at the rear of truck T going, e.g., 65 mph, creates strong shear forces on the boundaries of the low-pressure zone, providing a larger APZ.

Figure 2:
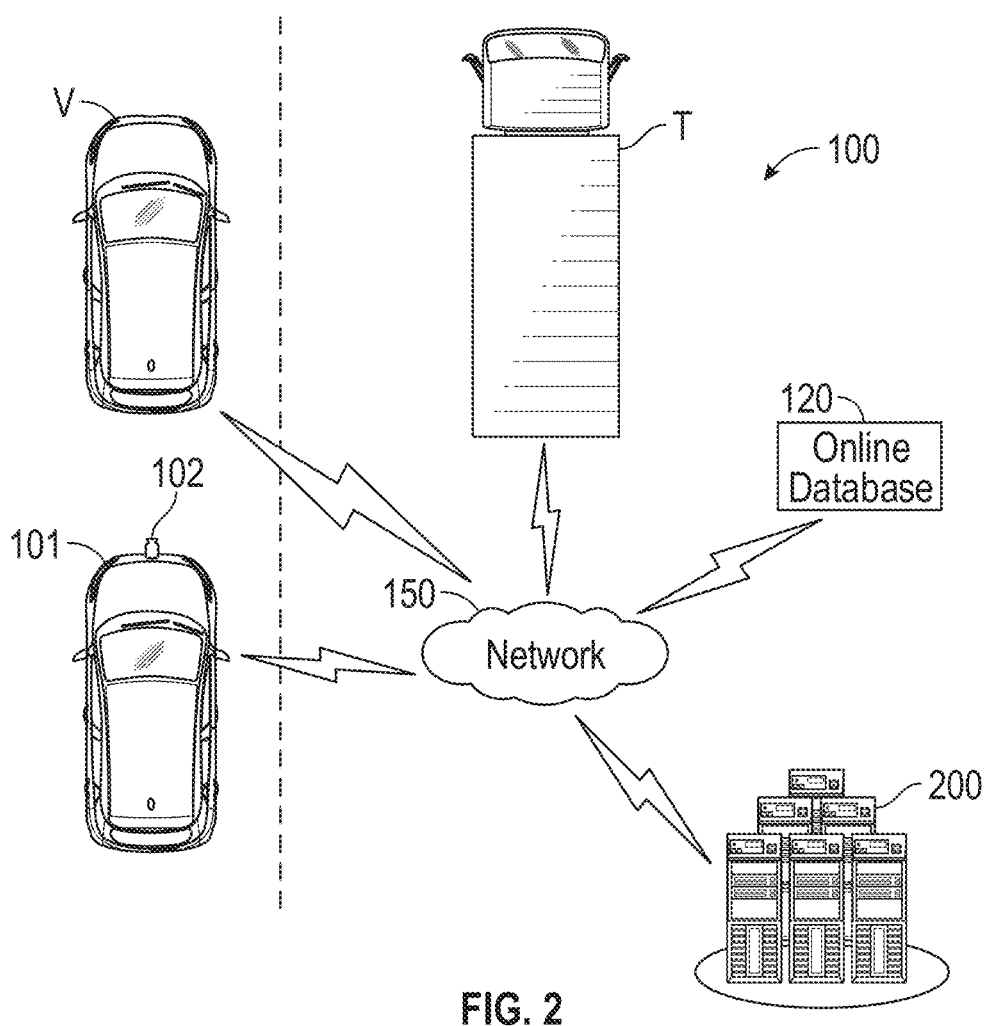
FIG. 2 illustrates a system for energy efficient mobility in accordance with the principles of the present disclosure.

Referring now to FIG. 2, system 100 for energy efficient mobility is provided. As shown in FIG. 2, system 200 may include vehicle 101 having device 102 for identifying one or more nearby vehicles on the road, e.g., vehicle V and/or vehicle T, and online database 120, all communicatively coupled to energy efficient operation platform 200 via, e.g., network 150. In some embodiments, vehicle 101 may interface directly with other capable vehicles on the road, e.g., vehicle V and/or vehicle T, over network 150, such that data may be shared by the "host" vehicle directly with nearby vehicles. For example, vehicle V and/or vehicle T may directly communicate vehicle information to vehicle 101. Energy efficient operation platform 200 may be located on one or more servers, and/or may be integrated with vehicle 101. Energy efficient operation platform 200 may calculate the energy require to complete a trip without switching lanes, as well as the energy required to switch lanes and cruise in the APZ of a nearby vehicle for the remainder of the trip, and determine which option would be the most energy efficient, while considering overall safety and cruising time.

Vehicle 101 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies, e.g., adaptive cruise control. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, energy efficient operation platform 200 may be configured and/or programmed to operate with a vehicle having a Level-4 or Level-5 autonomous vehicle controller.

In some embodiments, device 102 for identifying one or more nearby vehicles on the road may be one or more cameras for capturing image data of nearby vehicles. For example, the front camera(s) of vehicle 101 may be used to read the license plate of the vehicle ahead. This information may then be used to access online database 120 that may contain detailed specifications of the vehicle in front including, e.g., its dimensions, which may be used to calculate the cross-sectional area of the identified vehicle for determining the size of the APZ as described in further detail below. As shown in FIG. 2, vehicle T, e.g., a trailer truck, will have a larger APZ than vehicle V, e.g., a more aerodynamic vehicle.

In some embodiments, the image data captured by the one or more cameras may be used to perform a pixel by pixel comparison and to observe the changes in color, and identify the extreme corners of the identified vehicle in front, which may be used to determine the cross-sectional area of the identified vehicle for determining the size of the APZ, as well as estimating the drag forces. Additionally or alternatively, device 102 for identifying one or more nearby vehicles on the road may be a LIDAR scanning device, which may measure distance between vehicle 101 and the identified front vehicle for estimating drag force as a function of speed.

Online database 120 may include additional vehicle and/or driver information associated with the identified vehicle. For example, based on the license plate, or other identifying features of the front vehicle, energy efficient operation platform 200 may receive information indicative of, e.g., whether the vehicle has an anti-lock braking system (ABS), intelligent cruise control, autonomous braking, etc. This information may be used to determine a safe optimized cruise distance behind the identified vehicle. Additionally, depending upon level of access and information that may be deduced, vehicle maintenance record such as duration since last brake pad change, driver behavior (mild or aggressive, etc.), and/or speeding tickets may be obtained to gauge if the driver associated with the identified vehicle is a safe driver to follow or not.

Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, man-to-machine communication, and/or a vehicle-to-everything (V2X) communication.

Figure 3:
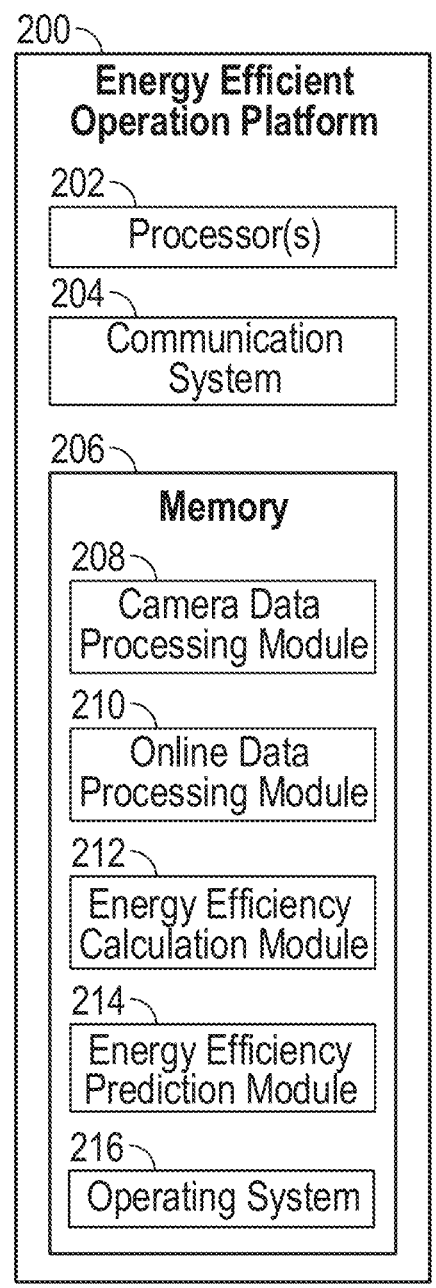
FIG. 3 shows some example components that may be included in an energy efficient operation platform in accordance with the principles of the present disclosure.

Referring now to FIG. 3, components that may be included in energy efficient operation platform 200 are described in further detail. Energy efficient operation platform 200 may include one or more processors 202, communication system 204, and memory 206. Communication system 204 may include a wireless transceiver that allows energy efficient operation platform 200 to communicate with vehicle 101, device 102, and online database 120. The wireless transceiver may use any of various communication formats, such as, for example, an Internet communications format, or a cellular communications format.

Memory 206, which is one example of a non-transitory computer-readable medium, may be used to store operating system (OS) 216, camera data processing module 208, online data processing module 210, energy efficiency calculation module 212, and energy efficiency prediction module 214. The modules are provided in the form of computer-executable instructions that may be executed by processor 202 for performing various operations in accordance with the disclosure.

Memory 206 may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 206 may incorporate electronic, magnetic, optical, and/or other types of storage media. In the context of this document, a "non-transitory computer-readable medium" can be, for example but not limited to, an electronic, magnetic, optical, electro-magnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). The computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Camera data processing module 208 may be executed by processor 202 for receiving and processing image data from device 102. For example, camera data processing module 208 may derive license plate information from the captured image data, and/or perform a pixel by pixel comparison of the image data and observe the changes in color, and identify the extreme corners of the identified vehicle in front for determining cross-sectional area. Additionally or alternatively, camera data processing module 208 may receive data from a LIDAR scanning device for determining cross-sectional area. In addition, camera data processing module 208 may perform image processing to identify the number of vehicles behind a particular vehicle. For example, if there are many vehicles behind a certain truck, for a certain speed, the model may discourage switching as benefits obtained may be minimal.

Online data processing module 210 may be executed by processor 202 for sending and receiving vehicle information data from online database 120. For example, based on the image data captured by device 102, online data processing module 210 may transmit license plate information data to online database 120 via network 150. As a result, online data processing module 210 may receive vehicle information data associated with the identified vehicle based on the license plate information. As described above, vehicle information may include information indicative of whether the vehicle has an anti-lock braking system (ABS), intelligent cruise control, autonomous braking, and vehicle maintenance record such as duration since last brake pad change, driver behavior (mild or aggressive, etc.), and/or speeding tickets.

Energy efficiency calculation module 212 may be executed by processor 202 for calculating a first energy required to complete a trip, determining a size of an APZ of the identified front vehicle based on the capture data from device 102, calculating a second energy required to transition to the APZ of the identified front vehicle and to complete the trip in the APZ of that vehicle, and determining whether the second energy is more energy efficient than the first energy.

For example, the net force on vehicle 101 may be calculated using Newton's second law, e.g., the vehicle motion equation:

$$m_v \frac{d}{dt} v(t) = F_t(t) - (F_a(t) + F_r(t) + F_g(t) + F_d(t))$$

where $F_t$=tractive force, $F_a$=aerodynamic drag force, $F_r$=rolling resistance force, $F_g$=gravitational force, and where $F_t>0$ indicates traction, $F_t<0$ indicates braking, and $F_t=0$ indicates coasting.

Once the net force is calculated, energy efficiency calculation module 212 may determine the energy using the following equations:

Energy=Force×Distance

Power=Force×Velocity

Energy efficiency calculation module 212 may use optimization techniques such as Adaptive Moment Estimation and Gradient Descent for optimizing the energy equation for the trip. Moreover, energy efficiency calculation module 212 may determine a size of an APZ of the identified front vehicle as a function of cross-sectional area of the identified front vehicle, speed of the identified front vehicle, and/or altitude. For example, vehicle T, e.g., a trailer truck, will have a larger APZ than vehicle V, e.g., a more aerodynamic vehicle. Moreover, braking distance also may be considered in this equation. For example, vehicles may change velocity in a coordinated manner to optimize combined drag losses for the vehicles.

In addition, energy efficiency calculation module 212 may calculate a second energy required to transition to the APZ of the identified front vehicle while taking into account the energy required to accelerate/decelerate vehicle 101 to approach the APZ, and to complete the trip in the APZ of that vehicle. Energy efficiency calculation module 212 further may determine the optimal distance to follow behind the identified front vehicle based on vehicle speed and braking efficiency to gain drag reduction while maintaining safe braking distance. For example, a smaller front vehicle may be followed at a closer distance than a larger truck. Accordingly, energy efficiency may be calculated for the switch to the APZ, and compared to the cruising time, speed and other factors including overall safety.

In some embodiments, energy efficiency calculation module 212 may cause vehicle 101 to automatically transition to the more energy efficient APZ if the second energy is determined to be more energy efficient than the first energy. Alternatively, energy efficiency calculation module 212 may generate and display information to a driver of vehicle 101 indicative of the energy efficiency to transition to the more energy efficient APZ, such that the driver may choose whether or not to make the transition. This information may further be accompanied by additional vehicle/driver information associated with the identified front vehicle such as driving history, speeding tickets, time since like brake change, etc., if available, so that the driver may factor overall safety of the transition.

In some embodiments, energy efficiency calculation module 212 may receive an input from the driver of vehicle 101, e.g., a selection between aggressive switching or minimal switching for a given trip. For example, a driver may prefer not to perform as many lane switches on a snowy day as opposed to a sunny day with less traffic. Accordingly, a percentage scale or the like may be provided to the driver via a user interface of vehicle 101 to select between aggressive switching or minimal switching modes.

Energy efficiency prediction module 214 may use machine learning and/or artificial intelligence to adapt to energy efficiency calculations executed by energy efficiency calculation module 212 for an individual driver, terrain, traffic conditions etc. The main motive is to optimize the energy used for the entire trip. Thus, vehicle 101 may continuously scout for "better vehicles" in the vicinity which may offer better "energy deals" and switch as appropriate. Additionally or alternatively, a priority list may be devised based on experimental data and/or vehicle model. For example, an SUV may be better than a hatchback, a hatchback may be better than a Sedan, and a Sedan may be better than a Motorbike.

Moreover, energy efficiency prediction module 214 generate a recommended "journey start time," e.g., a suggestion for when vehicle 101 should begin its planned navigation route based on energy efficiency calculations and traffic conditions/patterns available from, e.g., an online database. For example, some municipalities and/or countries have traffic laws which permit large trailer trucks to only be on the road during a predetermined time of the day, e.g., at night after 10 pm, in an effort to reduce traffic congestion on the road. Accordingly, energy efficiency prediction module 214 may generate a recommendation for vehicle 101 to begin a planned navigation route at a later time, e.g., at 10 pm, when energy efficiency prediction module 214 predicts there will be more large trucks on the road, e.g., based on information available from an online database or preprogrammed into energy efficiency prediction module 214. Moreover, energy efficiency prediction module 214 may take into account estimated traffic data available from an online database, and recommend a later start time to avoid poor traffic conditions with respect to energy efficiency. Thus, energy efficiency prediction module 214 may generate a recommendation including information indicative of the improved energy efficiency should vehicle 101 begin the planned navigation route at the later suggested time, e.g., "the energy for the entire trip would be approximately 10% more efficient if the journey starts at 10 pm instead of 5 pm." The driver of vehicle 101 may elect to follow the recommendation or not.

Figure 4:
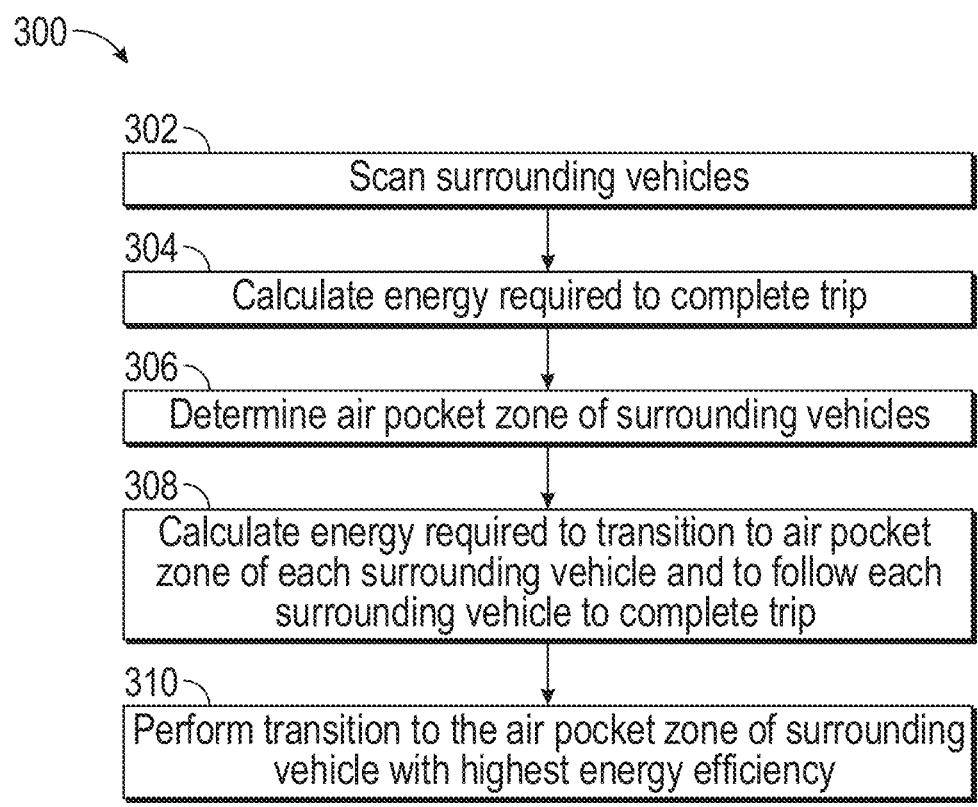
FIG. 4 is a flow chart illustrating exemplary steps for energy efficient mobility in accordance with the principles of the present disclosure.

Referring now to FIG. 4, exemplary method 300 for energy efficient mobility is described. At step 302, device 102 of vehicle 101 may scan/identify surrounding vehicles, and capture, e.g., image data of the surrounding vehicles. From the captured data, camera data processing module 208 may determine the cross-sectional area and/or speed and altitude of the identified front vehicle. At step 304, energy efficiency calculation module 212 may calculate a first energy, e.g., $E_{base}$, required to complete the trip without switching lanes. At step 306, energy efficiency calculation module 212 may determine the size of the APZ of each of the identified surrounding vehicles, e.g., using machine learning and/or AI.

At step 308, energy efficiency calculation module 212 may calculate a second energy required to transition to the APZ of each of the identified front vehicles, and to complete the trip in the APZ of each of those vehicles, e.g., $E_1$, $E_2$, $E_3$ ... $E_n$. Each of $E_1$, $E_2$, $E_3$ ... $E_n$ may be compared against $E_{base}$ to determine which APZ vehicle 101 should cruise in to optimize energy efficiency for the remainder of the trip. Accordingly, at step 310, vehicle 101 may transition to the APZ of the identified front vehicle having the highest energy efficiency.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A method for energy efficient mobility, the method comprising:
    receiving an input from a driver corresponding to aggressive switching or minimal switching for a given trip;
    identifying a first vehicle moving on a road;
    calculating a first energy required to complete a trip;
    determining a size of an air pocket zone of the first vehicle;
    calculating a second energy required to transition to the air pocket zone of the first vehicle and to complete the trip in the air pocket zone of the first vehicle;
    either transitioning to the air pocket zone of the first vehicle based on both the second energy being more energy efficient than the first energy and the input corresponding to the aggressive switching, or declining to transition to the air pocket zone of the first vehicle because the input corresponds to the minimal switching, even though the second energy is more energy efficient than the first energy;
    responsive to transitioning to the air pocket zone of the first vehicle, determining an optimal distance behind the first vehicle having optimal energy efficiency, wherein the optimal distance is based at least on each of whether the first vehicle has an anti-lock braking system, an intelligent cruise control system, and an autonomous braking system;
    identifying a second vehicle moving on the road, wherein identifying the second vehicle comprises receiving second vehicle information and second historical driver information from an online database, wherein the second vehicle information comprises a time since a last brake change of the second vehicle occurred, and wherein the second historical driver information comprises a driving history and a number of speeding tickets of a driver of the second vehicle;
    determining a size of an air pocket zone of the second vehicle;
    calculating a third energy required to transition to the air pocket zone of the second vehicle and to complete the trip in the air pocket zone of the second vehicle; and
    declining to transition to the air pocket zone of the second vehicle based on the second vehicle information and/or the second historical driver information, even though the third energy is more energy efficient than the second energy.

2. The method of claim 1, wherein identifying the first vehicle comprises capturing image data via a camera.

3. The method of claim 1, wherein identifying the first vehicle comprises using a LIDAR scanner.

4. The method of claim 1, wherein determining the size of the air pocket zone of the first vehicle comprises determining the size of the air pocket zone of the first vehicle via machine learning or artificial intelligence.

5. The method of claim 1, wherein determining the size of the air pocket zone of the first vehicle is based on a cross-sectional area of a rear of the first vehicle.

6. The method of claim 1, wherein determining the size of the air pocket zone of the first vehicle is based on a speed of the first vehicle.

7. The method of claim 1, wherein calculating the first energy comprises using at least one of Adaptive Moment Estimation or Gradient Descent.

8. The method of claim 1, wherein calculating the second energy comprises using the optimal distance.

9. The method of claim 1, wherein the optimal distance comprises a safe braking distance.

10. The method of claim 1, wherein the first vehicle is identified moving on a first lane of the road, wherein calculating the second energy comprises factoring in an energy required to switch lanes from a second lane of the road to the first lane, and wherein transitioning to the air pocket zone of the first vehicle comprises switching lanes from the second lane to the first lane.

11. The method of claim 1, further comprising receiving a recommendation to begin a planned navigation route at a suggested time because a plurality of large lead vehicles are predicted to be on the road at the later time, and wherein identifying the first vehicle moving on the road is performed at the suggested time.

12. The method of claim 1, wherein the input corresponding to the aggressive switching is associated with sunny weather, and wherein the input corresponding to the minimal switching is associated with snowy weather.

13. A system for energy efficient mobility, the system comprising:
    a device configured to identify a first vehicle and a second vehicle moving on a road;
    a memory that stores computer-executable instructions; and
    a processor configured to access the memory and execute the computer-executable instructions to:

receive an input from a driver corresponding to aggressive switching or minimal switching for a given trip;
calculate a first energy required to complete a trip;
determine a size of an air pocket zone of the first vehicle;
calculate a second energy required to transition to the air pocket zone of the first vehicle and to complete the trip in the air pocket zone of the first vehicle;
determine that the second energy is more energy efficient than the first energy;
either transition to the air pocket zone of the first vehicle based on both the second energy being more energy efficient than the first energy and the input corresponding to the aggressive switching, or decline to transition to the air pocket zone of the first vehicle because the input corresponds to the minimal switching, even though the second energy is more energy efficient than the first energy;
responsive to transitioning to the air pocket zone of the first vehicle, determine an optimal distance behind the first vehicle having optimal energy efficiency, wherein the optimal distance is based at least on each of whether the first vehicle has an anti-lock braking system, an intelligent cruise control system, and an autonomous braking system;
determine a size of an air pocket zone of the second vehicle;
calculate a third energy required to transition to the air pocket zone of the second vehicle and to complete the trip in the air pocket zone of the second vehicle;
receive second vehicle information and second historical driver information of the second vehicle and a driver of the second vehicle from an online database, wherein the second vehicle information comprises a time since a last brake change of the second vehicle occurred, and wherein the second historical driver information comprises a driving history and a number of speeding tickets of the driver of the second vehicle; and
receive an instruction not to transition to the air pocket zone of the second vehicle responsive to receipt of the second vehicle information and/or the second historical driver information, even though the third second energy is more energy efficient than the first energy.

14. The system of claim 13, wherein the device is a camera configured to capture image data.

15. The system of claim 14, wherein the processor is configured to receive vehicle information from an online database based on the image data.

16. The system of claim 13, wherein the processor is configured to calculate the first energy using at least one of Adaptive Moment Estimation or Gradient Descent.

17. The system of claim 13, wherein the processor is configured to determine the size of the air pocket zone of the vehicle using machine learning or artificial intelligence.

18. The system of claim 13, wherein the processor is further configured to access the memory and execute the computer-executable instructions to receive a recommendation to begin a planned navigation route at a suggested time because a plurality of large lead vehicles are predicted to be on the road at the suggested time.

* * * * *